United States Patent [19]

Kreuter et al.

[11] Patent Number: 5,797,368
[45] Date of Patent: Aug. 25, 1998

[54] RECIPROCATING PISTON INTERNAL COMBUSTION ENGINE HAVING AT LEAST ONE CYLINDER

[75] Inventors: Peter Kreuter; Peter Heuser, both of Aachen, Germany

[73] Assignee: Meta Motoren- und Energie-Technik GmbH, Herzogenrath, Germany

[21] Appl. No.: 717,972

[22] Filed: Sep. 23, 1996

[30] Foreign Application Priority Data

Sep. 21, 1995 [DE] Germany ............... 195 35 147.9

[51] Int. Cl.$^6$ .................................................. F02B 31/08
[52] U.S. Cl. ................................................... 123/308
[58] Field of Search .................................. 123/306, 308

[56] References Cited

U.S. PATENT DOCUMENTS

| | | | |
|---|---|---|---|
| 1,897,293 | 2/1933 | Bailey | 123/306 |
| 4,285,310 | 8/1981 | Takizawa et al. | 123/308 |
| 4,354,463 | 10/1982 | Otani et al. | 123/306 |
| 4,484,550 | 11/1984 | Gadefelt et al. | 123/308 |
| 4,974,566 | 12/1990 | LoRusso et al. | 123/308 |
| 5,558,061 | 9/1996 | Suminski | 123/306 |

FOREIGN PATENT DOCUMENTS

| | | |
|---|---|---|
| 478415 | 6/1929 | Germany. |
| 490094 | 1/1930 | Germany. |
| 4301453 | 8/1994 | Germany. |

*Primary Examiner*—Andrew M. Dolinar
*Attorney, Agent, or Firm*—Robert W. Becker & Associates

[57] ABSTRACT

A reciprocating piston internal combustion engine has at least one cylinder with a spark plug and at least one piston reciprocating within the at least one cylinder. At least one first intake duct having a mouth connected to the cylinder and a valve seat located at the mouth is provided. At least one first intake valve resting at the valve seat in a closing position of the intake valve is provided. A control device controls the lift action of the first intake valve. The first intake valve is designed such that, in flow direction of the fuel into the cylinder, for short lifts of the first intake valve a flow cross-section of the first intake duct into the cylinder at the mouth is throttled in a throttle area extending at least over an angular distance about a central axis of the first intake valve such that for small valve lifts a directed inflow with increased velocity results. Alternatively, the intake duct has a wall portion extending downstream of the valve seat in the flow direction that is designed so as to provide a throttle area extending at least over an angular distance about a central axis of the first intake valve such that for small valve lifts a directed inflow with increased velocity results.

15 Claims, 8 Drawing Sheets

DRAWING PROPOSAL

DRAWING PROPOSAL

DRAWING PROPOSAL

5,797,368

RECIPROCATING PISTON INTERNAL COMBUSTION ENGINE HAVING AT LEAST ONE CYLINDER

FIELD OF INVENTION

The invention concerns a reciprocating-piston internal-combustion engine having at least one cylinder with a piston reciprocatingly displaceable therein. At least one cylinder with a piston reciprocatingly disposed therein, at least one inlet valve for opening or closing an inlet duct which opens into the cylinder and which in the closed position rests on a valve seat at the mouth opening region of the inlet duct is provided as well as an arrangement for controlling the lift and/or the period of opening of the inlet valve.

BACKGROUND OF THE INVENTION

An internal combustion engine of the aforementioned kind is disclosed in DE 43 01 453.4 and is diagrammatically illustrated in FIG. 13 of the drawings accompanying the present specification. In this engine cam disks on two camshafts 1 and 2 act on cam followers 4 and 5. The cam follower 5 is provided on a rocker arm 7 for actuating an inlet valve 8 of the non-represented reciprocating-piston internal combustion engine. The rocker arm 7 is mounted at P2 on a pivotal lever 9 which carries the other cam follower 4 and which is mounted at P1 in fixed relationship with the main support structure. A compression spring 11 provides that the cam follower 5 is constantly in contact with the cam contour of the camshaft 2 and the rocker arm 7 bears constantly against the valve 8. As described in detail in this publication, depending on the respective phase position of the camshafts 1 and 2 rotating at the same speed, the period of opening and concomitantly therewith the lift of the inlet valve can be varied within such wide limits that the throttle flap valve can be omitted in a reciprocating-piston internal-combustion engine which is equipped with such an arrangement. It is advantageous if one of the two camshafts 1 or 2 controls the beginning of opening of the inlet valve 8 and the other camshaft controls closing of the inlet valve 8. If the phase of the camshaft which controls valve opening remains constant relative to the crankshaft, then it is possible by simply changing the phase of the camshaft controlling valve closing relative to the camshaft controlling valve opening to control the inlet valve 8 in such a way that, with a substantially identical opening flank, the closing flank moves away from the opening flank so that under operational conditions close to idling, the inlet valve is briefly opened with a small lift movement. This opening action can be increased until full lift movement with subsequent closing flank is reached. A typical family of curves showing the course of the valve lift as a function of the rotation of the crankshaft is shown in FIG. 14. The elimination of the throttle flap valve in internal combustion engines of this kind makes considerable fuel savings possible.

Other prior art internal combustion engines also have devices with which, when the inlet valve performs a constant lift movement, only the period of opening thereof can be influenced, that being made possible, for example, by an electromagnetic valve drive.

It is therefore an object of the present invention is further to improve the operating characteristics of a reciprocating-piston internal-combustion engine.

SUMMARY OF THE INVENTION

The specific and deliberate constriction of the intake (inflow) cross-section for the flow into cylinder, at least in an angular region around the axis of movement of the inlet valve, for small valve lift movements, provides that the charge movement within the cylinder can be specifically and deliberately influenced, i.e., increased in particular in the range of small valve lifts. In part-load range of engine operation, this improves mixture formation and combustion, reduces ignition delay and combustion time, and increases residual gas compatibility and the capability for lean-burn operating conditions in the engine. All this produces a further reduction in fuel consumption and, at the same time, improved exhaust gas quality. The full-load range of engine operation engine is scarcely adversely affected by the present invention as the intake flow cross-section is reduced only in the range of small valve lifts. The invention can be used in engines with external or internal mixtures formation as well as for compression-ignition engines and spark-ignition engines since a specific and deliberate influencing of the charge movement under low-load conditions is overall advantageous. The invention can advantageously be used in particular in relation to Otto-cycle engines whose load is controlled by varying lifts and/or periods of opening (lift action) of the inlet valve(s) of the cylinder(s).

BRIEF DESCRIPTION OF THE DRAWINGS

Further objects, features and advantageous of the invention will be described in greater detail hereinafter with reference to preferred embodiments thereof illustrated in the drawings. It is shown in.

DESCRIPTION OF PREFERRED EMBODIMENTS

Figure 1:
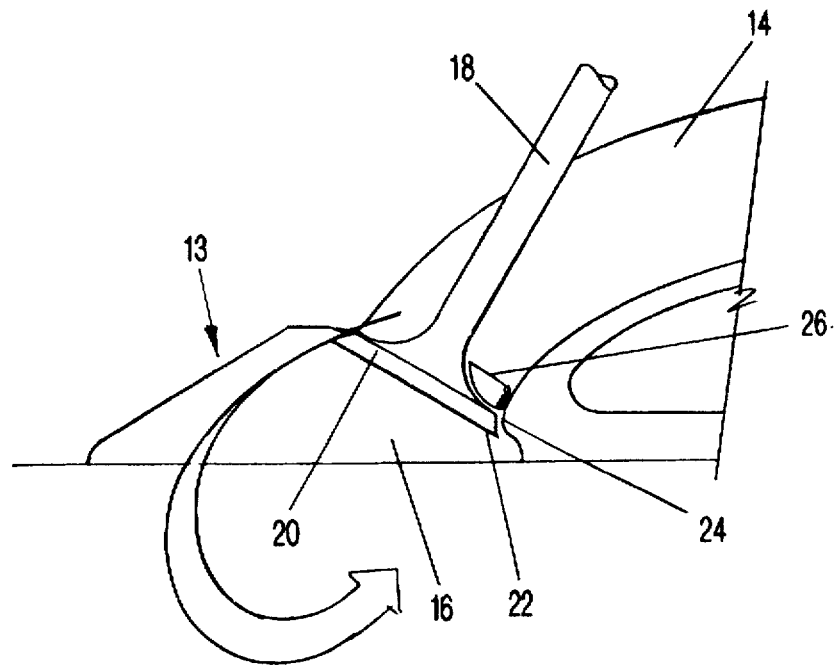
FIG. 1 a side view in section of a first embodiment of the invention.

Referring firstly to FIG. 1, reference numeral 13 therein generally denotes a cylinder head of a reciprocating-piston internal combustion engine in which an inlet (intake) duct is provided, as indicated generally by reference numeral 14. An inlet (intake) valve 18 operates with in the mouth of the inlet duct 14 leading into a combustion chamber 16. In the closed position of the inlet valve 18, the valve head 20 rests with a peripheral surface 22 in a manner known per se against a valve seat. The valve seat 24 is thus formed at the mouth of the inlet duct 14 opening into the combustion chamber 16.

As is clearly shown in FIG. 1, in an angular region which is facing outwardly relative to the combustion chamber 16, the valve head 20 is provided with a bar or web portion 26 which extends parallel to the adjacent surface of the inlet duct 14 at a small spacing therefrom.

The above-described configuration provides the following effect: When the inlet valve 18 opens slightly, that is to say with a small lift, the intake flow cross-section is substantially closed by the small spacing between the web portion 26 and the inside surface of the inlet duct 14 so that the inflow, as illustrated in FIG. 1, occurs only in the upper region of the mouth opening of the inlet duct. A tumble flow is thus produced, i.e., an inflow of the charge within the inlet duct 14 tangentially orientated at the top side of the combustion chamber and forming an eddy with an axis directed substantially perpendicularly to the axis of the cylinder (not shown). When larger valve lifts are involved, for example valve lifts of more that 20–30% of the maximum valve lift, the web portion 26 comes free from the wall of the inlet duct 14 so that in that case the inflow of the charge mixture occurs along the entire periphery of the valve head 20. This ensures proper filling of the combustion chamber with the charge mixture. Therefore, the illustrated tumble flow occurs only in the low-load range of engine operation. The above-described and illustrated influence on the charge movement is also operative in the case of engines in which the duration of opening of the inlet valve 18 is altered as a function of load, since with very short periods of opening, as measured in relation to the overall period of opening, the time period during which the inflow cross-section is reduced or constricted increases.

The specific and directed effect of intensifying the movement of the charge mixture or increasing the kinetic energy of the inflow in the low-load range or part-load range of engine operation provides that the intake flow speed is increased and the charge mixture movement is thus specifically and directly influenced. Especially in conjunction with a load control including influencing the valve lift, the mixture formation and combustion in the low-load range of engine operation of the engine, in an engine in which load control is effected without a throttle flap valve, can be considerably improved with the inventive measure. The ignition lag and the combustion time can be reduced so that the efficiency of the engine is increased and its fuel consumption is reduced. In addition, a better residual gas compatibility and an improved lean-burn capability are provided, whereby fuel consumption and/or the pollution content in the exhaust gas can be favorably affected. The power output and torque under full load conditions are scarcely affected.

Typical valve lifts, for which the web portion 26 on the valve 18 is operative, are between about 0.5 mm and 3 mm when the full lift of the inlet valve 18 is of the order of magnitude of 10 mm.

A secondary effect which is achieved with the web portion 26 on the valve head 20 of the inlet valve 18 is that fuel collects on the valve head 20 within the web portion 26 and is not transported by the inflow directly into the combustion chamber, so that there is no risk of fuel passing directly into the combustion chamber 16 in the form of a fuel film on a wall surface and disadvantageously affecting the combustion process and also the pollutant content in the exhaust gas.

Typically the web portion 26 extends over an angular distance of 100° to 220° around the axis of the inlet valve 18. The required angular range depends on the desired level of intensity of the tumble flow.

Figure 2:
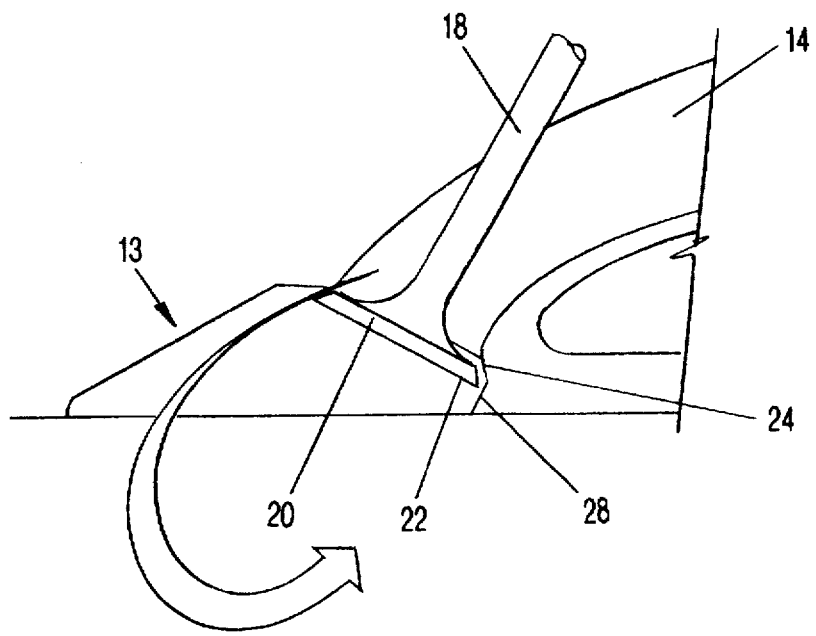
FIG. 2 a view corresponding to the view of FIG. 1 of a further embodiment.

FIG. 2 show an embodiment which is modified in comparison with FIG. 1. The difference here is that the tumble flow, as indicated by the arrow in FIG. 2, is not produced by means of a web portion 26 on the head 20 of the inlet valve 18, but by the mouth of the inlet duct 14, at the outside of the combustion chamber or cylinder (not shown), being of such a configuration that the wall 28 of the inlet duct 14, downstream of the seat surface 24, extends in this region parallel relationship to the direction of movement of the inlet valve 18, over a distance (length) corresponding to a small valve lift. Thus, similarly to the embodiment shown in FIG. 1, when small valve lifts are involved, this arrangement provides an intake cross-section only in the upper region of the inlet duct 14 or combustion chamber 16, as shown in FIG. 2.

Figure 3:
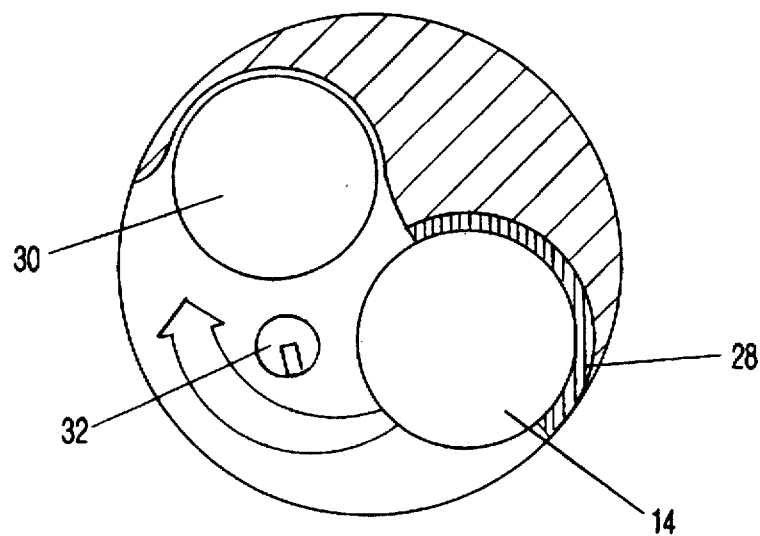
FIG. 3 a view of a cylinder head from the combustion chamber

FIG. 3, shows therein is a view onto the cylinder head, from the interior of the cylinder or as viewed from the reciprocating piston. The illustrated peripheral surface is that of the cylinder. The mouth of the inlet duct 14 and the mouth of an exhaust duct 30 are shown. The opening for a spark 32 plug can also be seen.

The hatched area in FIG. 3 corresponds to a design of the cylinder head such that, when the piston is at the top dead center position, there is only a minimal gap between the top of the piston and the hatched surface are. In the peripheral region of the inlet duct 14, which is shown by the thick black illustration in FIG. 3, the mouth of the inlet duct 14 has a wall 28 similar to the wall 28 shown in FIG. 2 so that, for small lifts, of the non-represented an flow occurs in the direction indicated by the arrow in FIG. 3, i.e., substantially tangential relative to the outside wall of the cylinder and forming an eddy flow with an axis extending in the direction of the axis of the cylinder. The eddy flow is advantageously directed in such a way that it passes over the region of the spark plug 32.

Figure 4:
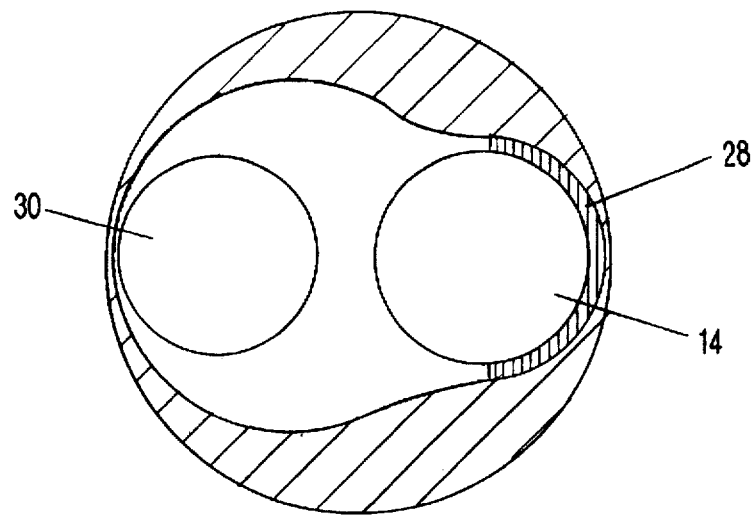
FIG. 4 a view similar to the view of FIG. 3 of a modified embodiment of a cylinder head.

The configuration shown in FIG. 4 differs from that shown in FIG. 3 in that the hatched areas are symmetrical relative to the connecting line between the inlet duct 14 and the exhaust duct 30. The wall 28, within the area of which no substantial inflow can be produced when the inlet valve opens with a small valve lift, is arranged symmetrically relative to the connecting line between the inlet duct 14 and the exhaust duct 30, at the outside of the cylinder. Accordingly, the configuration of the cylinder head illustrated in FIG. 4 provides for the formation of a tumble flow, as illustrated in FIG. 2. It will be appreciated that, in the embodiments of FIGS. 3 and 4, the wall 28 could be replaced by corresponding web portions on the inlet valve 18, corresponding to the web portion indicated at 26 in FIG. 1.

Figure 5:
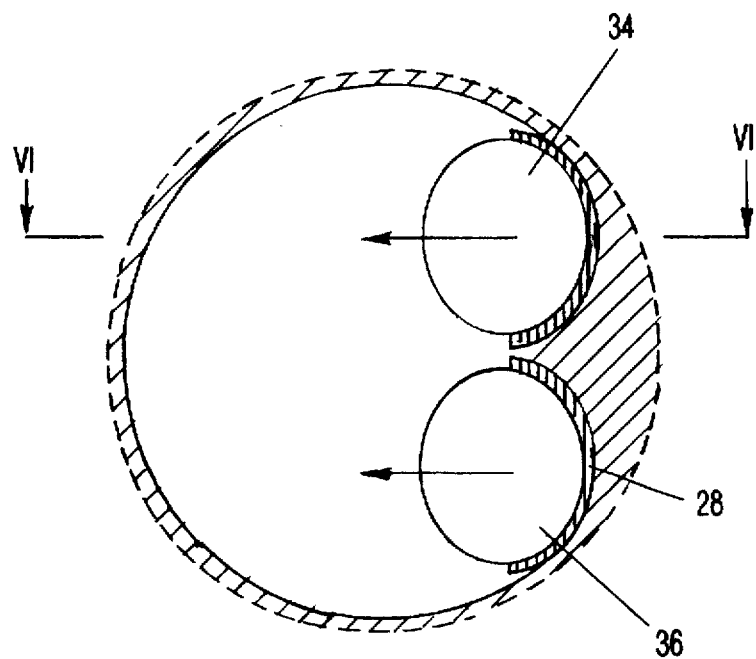
FIG. 5 an inside view of a cylinder head with two inlet ducts.

FIG. 5 shows a view from below of a cylinder head with two inlet ducts 34 and 36 disposed in side-by-side relationship. The respective exhaust ducts are not shown. The hatched area in FIG. 5, which indicates the area of the cylinder head which is directly adjacent to the top of the piston when in the top dead center position and serves as a squeeze surface in order to impart a movement to the charge mixture in the cylinder when the piston is at the top dead center position is here formed symmetrically relative to a plane which extends between the inlet ducts 34 and 36 and through the axis of the cylinder. A thick dark line around each of the inlet ducts 34 and 36 again denotes the wall region 28 which extends towards the outside periphery of the cylinder from the seat surface 24, parallel to the line of movement of the inlet valve 18 as shown in FIG. 6, and which there constricts the inflow cross-section over a portion of the valve lift movement.

Figure 6:
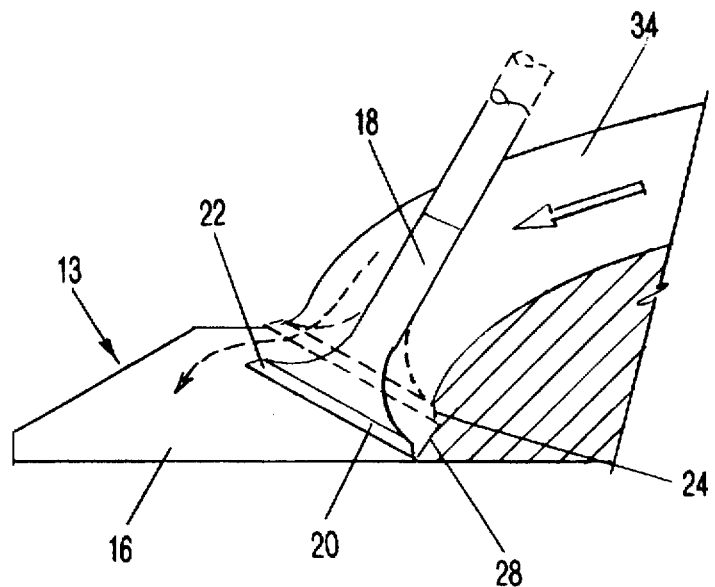
FIG. 6 a view in section in the plane VI—VI of FIG. 5.

FIG. 6 is a sectional view in section taken along line VI—VI in FIG. 5, with the inlet valve 18 of the inlet duct 34 being shown in a closed position and in a partially opened position corresponding to a small valve lift. It will be clearly apparent from FIG. 6 how, when the inlet valve 18 is in the partially open positioned shown therein, the flow of charge mixture into the combustion chamber 16 occurs substantially above the valve 18 and tangentially relative to the top surface of the combustion chamber 16 so that a tumble flow is generated in the combustion chamber by virtue of the mutually symmetrical configuration of the two inlet ducts 34 and 36.

Figure 7:
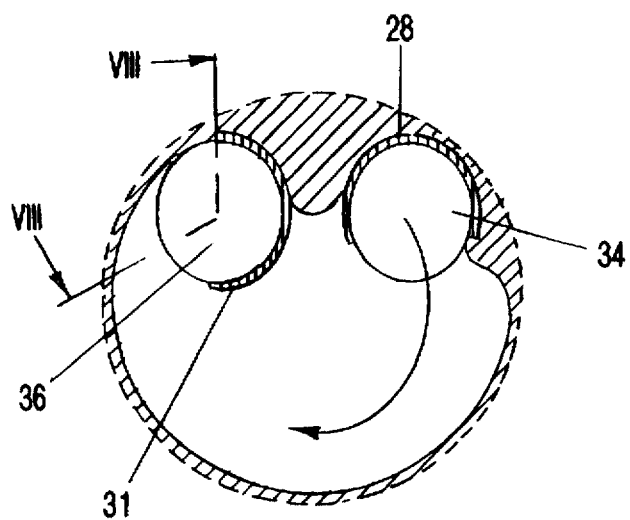
FIG. 7 an inside view of a cylinder head which is modified in comparison with FIG. 5.
Figure 8:
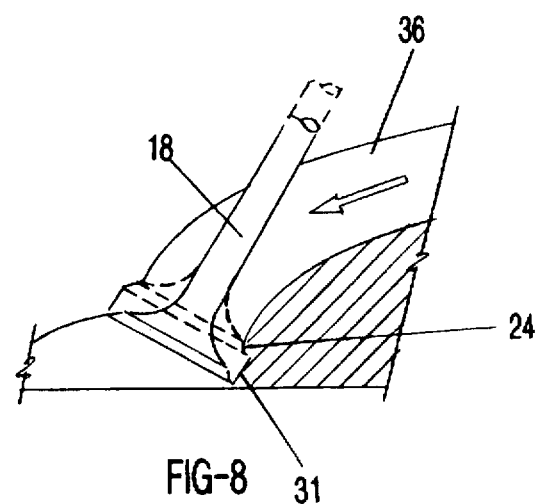
FIG. 8 a view in section taken along line VIII—VIII of FIG. 7.

FIGS. 7 and 8 show an embodiment, which is modified in comparison with FIGS. 5 and 6, of a cylinder head having two inlet ducts 34 and 36 and two associated inlet valves 18.

As can be seen in FIGS. 7 and 8, the wall 28 of the mouth the inlet duct 34, which constricts the inflow cross-section for small valve lift movements, is of such a configuration that there is a tangential eddy flow into the combustion chamber. In contrast the mouth of the inlet duct 36, which in FIG. 8 is shown in section taken along the line VIII—VIII of FIG. 7, is of such a configuration that the seat 24 is overall set back so that the wall portion 31 downstream of the seat 24 of the cylinder head is of a cylindrical configuration and does not provide any flow cross-section or provides only a very small flow cross-section, over a part of the lift movement of the valve 18. This embodiment provides that, for small valve lifts, i.e., in the low-load range of engine operation there is an eddy flow that becomes increasingly weaker in the full-load range and which is combined with the intake flow entering the combustion chamber through the inlet duct 36.

Figure 9:
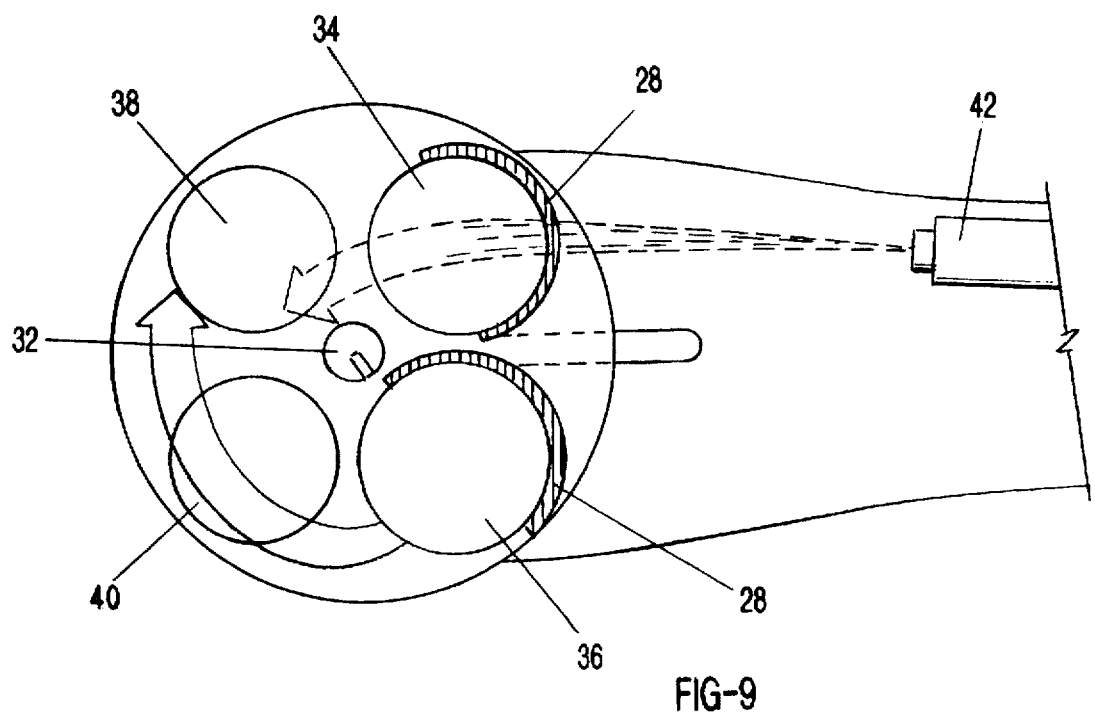
FIG. 9 a schematic inside view of a four-valve cylinder head.

FIG. 9 shows a further modified embodiment of a cylinder head having two inlet ducts 34 and 36 arranged in side-by-side relationship, two exhaust ducts 38 and 40 arranged in side-by-side relationship, and a central spark plug 32. The wall 28 of the inlet duct 34 downstream of the respective valve seat is of such a configuration that, in the range of small valve lifts, there is an inflow which reaches directly the region of the spark plug 32. The wall of the other inlet duct 36 is of such a configuration that, in the range of small valve lifts, an inflow tangentially relative to the peripheral surface of the cylinder occurs. Those inflows from the respective inlet ducts 34 and 36 are indicated by arrows in FIG. 9. This embodiment is particularly advantageous when a fuel metering device 41 is associated with the inlet duct 34 which, upstream of the seat, can be embodied separately from the inlet duct 36 or combined with the inlet duct 36 within the cylinder head. The fuel metering device 41 sprays fuel in such a way that, together with the inflow of air, it passes into the region of the spark plug 32. The eddy flow entering from the inlet duct 36 causes the fuel to be further concentrated onto the region of the spark plug 32, which results in good combustion.

The embodiments shown in FIGS. 5 through 9, each having two inlet valves, can be further improved in regard to their thermodynamic properties if the inlet valves which operate in the inlet openings or ducts 34 and 36 are controlled individually in respect of their lift and/or their opening period. In that way the intake flow conditions and the combustion conditions in the combustion chamber can be adapted optimally to the respective operating requirements.

Figure 10:
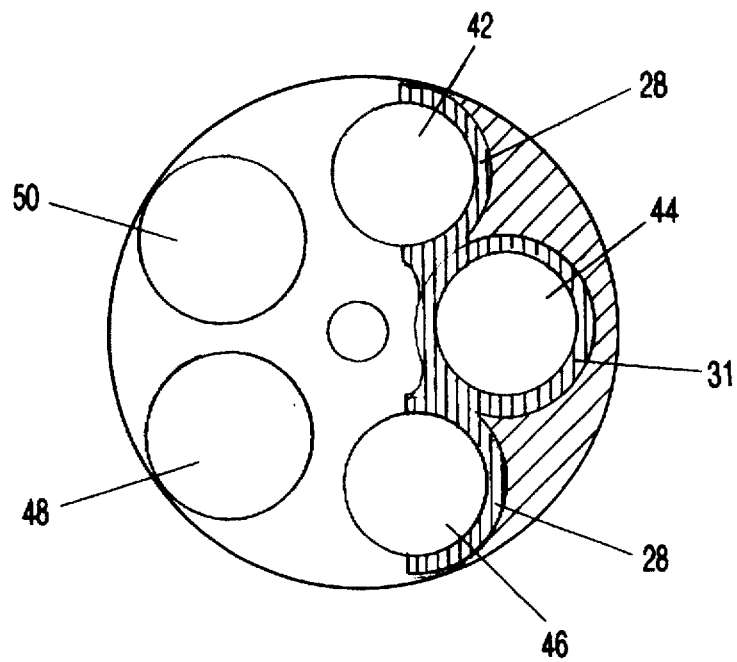
FIG. 10 a schematic view of a five-valve cylinder head having three inlet valves with a central one having a cylindrical wall.
Figure 11:
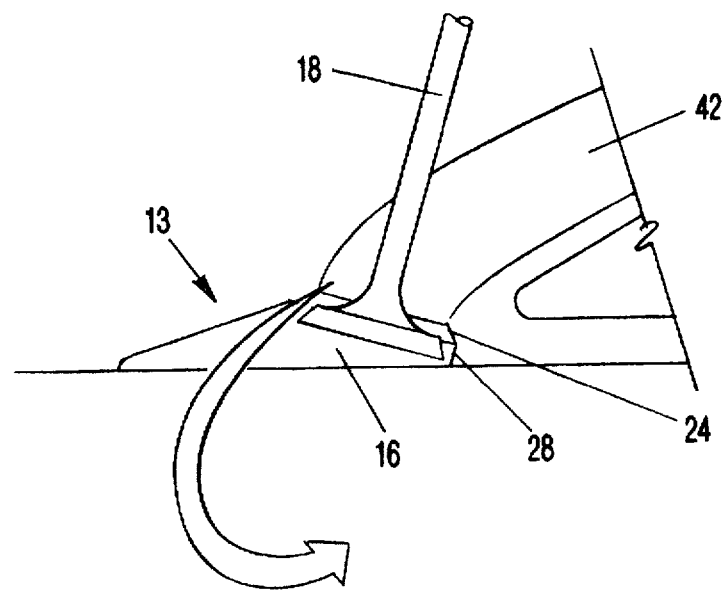
FIG. 11 a diagrammatic side view in section of one of the two lateral inlet valves of the three inlet valves shown in FIG. 10.
Figure 12:
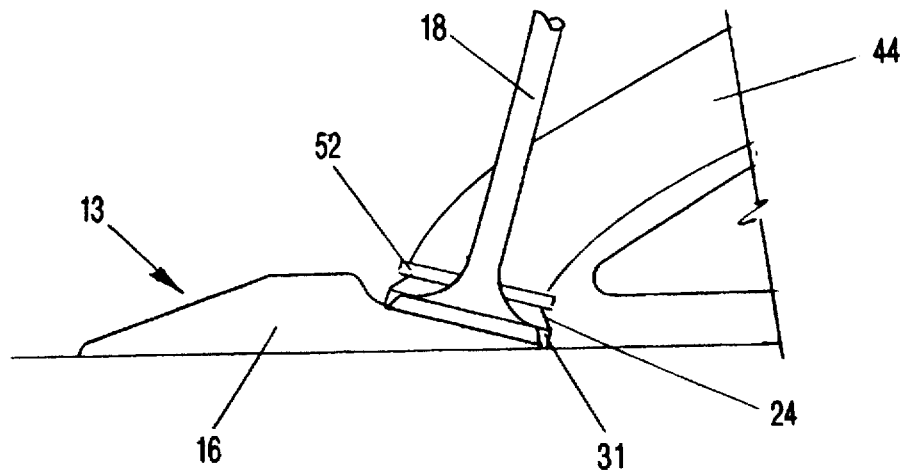
FIG. 12 is a side view in section of the central one of the three inlet valves in FIG. 10.

FIGS. 10, 11, and 12 show the use of the present invention in relation to a five-valve cylinder head having three inlet valves and three inlet ducts or openings as indicated at 42, 44, and 46, and two exhaust ducts or openings 48 and 50.

As can be seen clearly from FIGS. 10 and 11, the two outer inlet ducts 42 and 46 are provided with mouths whose walls 28, downstream of the seat 24 in the cylinder head, are of such a configuration that, with a small lift movement of the inlet valve 18, the walls 28 reduce the flow cross section over an angular distance of about 180°, the edges of which are positioned in a plane extending through the centers of the mouths of the inlet ducts 42 and 46. That arrangement produces a tumble flow issuing from the inlet ducts 42 and 46 in the low-load range of operation or the part-load range of operation of the engine, in a similar manner to the embodiment shown in FIG. 5.

The mouth of the central inlet duct 44, as shown in FIG. 12, with the seat 24, is moved as a whole away from the combustion chamber 16, relative to the two outer inlet ducts 42 and 46, so that downstream of the valve seat 24, the cylinder head provides a cylindrical wall as indicated at 31 in FIG. 12, which substantially closes the inflow cross-section when the valve 18 operates with small valve lift movements. The third inlet valve which, in the case of five-valve engines, is generally at an angle that is different form the respective angle of inclination relative to the axis of the cylinder the two outer inlet valves thus only becomes operative when the valves perform larger valve lift movements or the engine is under higher load, whereby under part-load condition a high charge mixture movement is provided for good combustion while under full-load condition a high degree of cylinder filling is achieved.

Figure 10A:
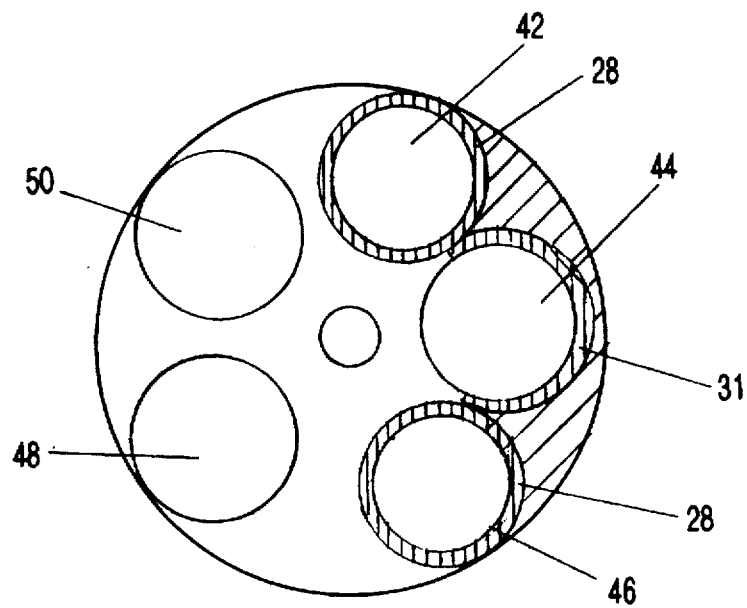
FIG. 10A is a schematic view of a five-valve cylinder head having three inlet valves, wherein the two outer ones have a cylindrical wall.
Figure 11A:
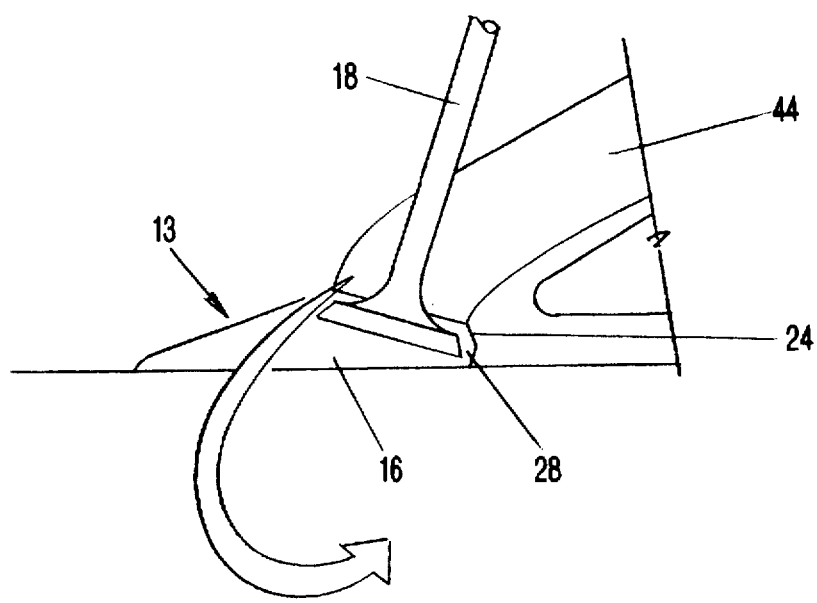
FIG. 11A is a diagrammatic side view in section of the central one of the inlet valves of FIG. 10A.
Figure 12A:
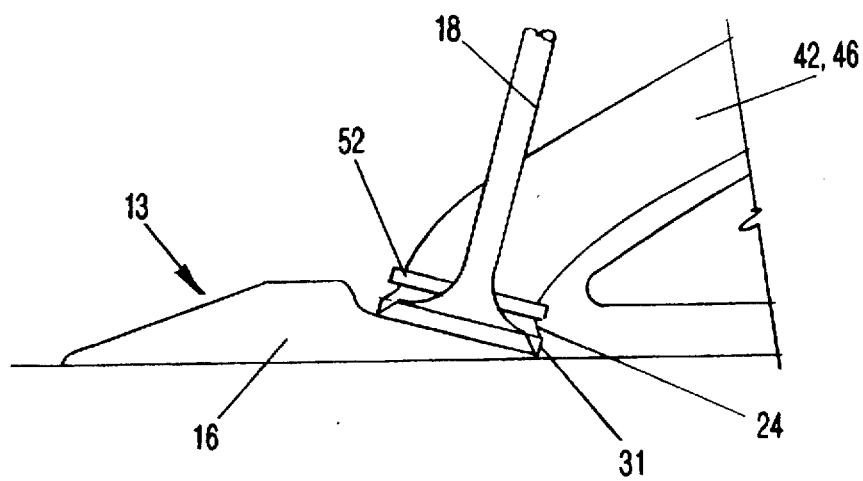
FIG. 12A is a diagrammatic side view in section of the two outer ones of the inlet valves of FIG. 10A.
Figure 13:
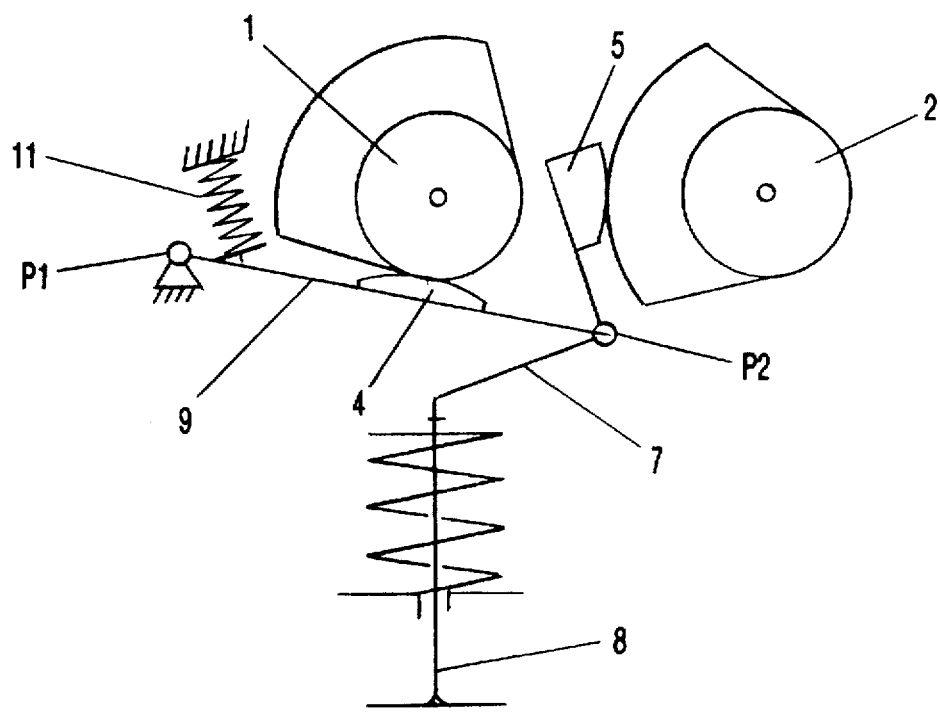
FIG. 13 a sketch, which has already been described above, of a prior art arrangement for load-dependent control of the opening function of an inlet valve.
Figure 14:
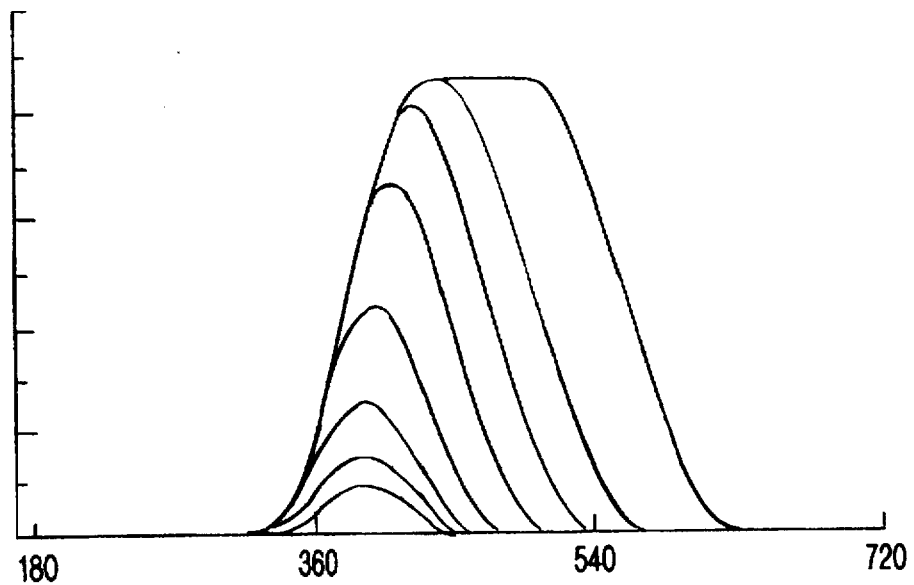
FIG. 14 shows a family of valve lift curves of the prior art device of FIG. 13.

As FIG. 12 further shows, provided above the seat 24 at the central inlet duct 44 is a peripherally extending groove 52 which ensures that no fuel can pass as a film spread on the wall into the combustion chamber 16. Such a groove 52 may also be provided at the other inlet ducts. In situations of use in which a particularly high-energy inflow is advantageous under low-load or part-load operating conditions of the engine, the arrangement shown in FIGS. 10 through 12 can be reversed as shown by FIGS. 10A, 11A and 12A. The central inlet duct 44 is of such configuration that a tumble flow which directly reaches the spark plug issues from the central inlet duct 44 under low-load condition, and the two outer inlet ducts 42 and 46 are of such a configuration that they remain entirely or at least substantially closed for small valve lift movements.

It should be noted that in the drawings the respective inlet ducts are each illustrated in such a way that they open at a slant into the cylinder or combustion chamber from the outside. It will be appreciated that arrangements in which the valves extended parallel to the at least cylinder axis are also possible. It will further be appreciated that the illustrated embodiments may be varied in many ways, for example, by providing in the low-load range of operation neither a pure tumble flow nor a pure eddy flow, but a combination of those two. A tumble flow generally has the advantage over a pure eddy flow there is less danger of the air-fuel mixture becoming leaner in the vicinity of the spark plug.

The present invention is, of course, in no way restricted to the specific disclosure of the specification and drawings, but also encompasses any modifications within the scope of the appended claims.

What we claim is:

1. A reciprocating piston internal combustion engine, comprising;

at least one cylinder with a spark plug and at least one piston reciprocating within said at least one cylinder;

at least two intake ducts, each having a mouth connected to said cylinder and a valve seat located at said mouth;

at least two intake valves, each resting at one of said valve seats in a closing position of said intake valves;

a control device for controlling the lift action of said intake valves;

wherein a wall portion of a first one of said intake ducts is located downstream of said valve seat and extends along the entire circumference of said first intake duct parallel to a direction of movement of said intake valve correlated with said first intake duct over a length matching the length of small valve lifts.

2. A reciprocating piston internal combustion engine according to claim 1, wherein a second one of said intake ducts has a wall portion extending downstream of said valve seat in a flow direction of fuel into said cylinder and is designed such that, in said flow direction, for small lifts of said intake valve correlated with said second intake duct, a flow cross-section of said second intake duct into said cylinder at said mouth is throttled in a throttle area extending at least over an angular distance about a central axis of one of said intake valves correlated with said second intake duct, such that for small valve lifts a directed inflow with increased velocity results.

3. An internal combustion engine according to claim 2, wherein said wall portion of said second intake duct is located at a side of said mouth proximal to the circumferential cylinder wall.

4. An internal combustion engine according to claim 3, wherein said wall portion of said second intake duct is designed such that the directed inflow for small valve lifts is a tumble flow.

5. An internal combustion engine according to claim 3, wherein said wall portion of said second intake duct is designed such that the directed inflow for small valve lifts is an eddy flow.

6. An internal combustion engine according to claim 3, wherein a wall portion of a third one of said inlet ducts is embodied identically to said wall portion of said second inlet duct and wherein said wall portions of said second and third inlet ducts are located downstream of said valve seat adjacent to the circumferential cylinder wall and extend parallel to a direction of movement of said intake valves correlated with said second and third intake ducts over a length matching the length of small valve lifts.

7. An internal combustion engine according to claim 6, wherein said wall portions of said second and third inlet ducts are symmetrical relative to a plane extending therebetween and through a center axis of said cylinder that for small valve lifts the directed inflows are in the form of tumble flows flowing substantially parallel to one another.

8. An internal combustion engine according to claim 2, wherein said wall portion of said second intake duct downstream of said valve seat is designed such over a length matching the length of small valve lifts that for small valve lifts an eddy flow results that extends tangentially to the cylinder wall.

9. An internal combustion engine according to claim 2, wherein said throttle area is located at a side of said mouth proximal to the circumferential cylinder wall.

10. An internal combustion engine according to claim 9, wherein said throttle area is designed such that the directed inflow for small valve lifts is a fumble flow.

11. An internal combustion engine according to claim 9, wherein said throttle area is designed such that the directed inflow for small valve lifts is an eddy flow.

12. An internal combustion engine according to claim 1, comprising three of said intake ducts, wherein said first intake duct with said wall portion, extending along the entire circumference of said first intake duct parallel to a direction of movement of said intake valve, is positioned between the other two of said intake ducts.

13. An internal combustion engine according to claim 1, comprising three of said intake ducts and three of said intake valves, wherein a wall portion of a second one of said intake ducts is located downstream of said valve seat and extends along the entire circumference of said second intake duct parallel to a direction of movement of one of said intake valves correlated with said second intake duct over a length matching the length of small valve lifts, wherein the third one of said intake valves is positioned between said first and second intake valves and is designed such that the inflow for small valve lifts is a tumble flow.

14. An internal combustion engine according to claim 1, wherein the small valve lifts are 5% to 30% of a maximum valve lift.

15. An internal combustion engine according to claim 1, wherein said intake ducts extends from the exterior of said cylinder at a slant into said cylinder.

* * * * *